(12) United States Patent
Ishii et al.

(10) Patent No.: US 8,664,566 B2
(45) Date of Patent: Mar. 4, 2014

(54) ARC WELDING APPARATUS AND METHOD

(75) Inventors: Hideo Ishii, Osaka (JP); Tetsuro Ikeda, Osaka (JP); Kenzo Danjo, Osaka (JP); Atsushi Kinoshita, Osaka (JP)

(73) Assignee: Sansha Electric Manufacturing Co., Ltd., Osaka (JP)

( * ) Notice: Subject to any disclaimer, the term of this patent is extended or adjusted under 35 U.S.C. 154(b) by 1217 days.

(21) Appl. No.: 11/422,624

(22) Filed: Jun. 7, 2006

(65) Prior Publication Data

US 2007/0284349 A1 Dec. 13, 2007

(51) Int. Cl.
*B23K 9/10* (2006.01)
(52) U.S. Cl.
USPC .............. 219/130.4; 219/130.1; 219/137.7
(58) Field of Classification Search
USPC .............. 219/130.4, 130.5, 130.1, 137.7
See application file for complete search history.

(56) References Cited

U.S. PATENT DOCUMENTS

| | | | | |
|---|---|---|---|---|
| 3,002,084 A * | 9/1961 | Sullivan | | 219/127 |
| 3,679,866 A * | 7/1972 | Arikawa et al. | | 219/137 R |
| 4,324,971 A * | 4/1982 | Frappier | | 219/121.56 |
| 4,929,811 A * | 5/1990 | Blankenship | | 219/121.54 |
| 5,189,277 A * | 2/1993 | Boisvert et al. | | 219/121.54 |
| 5,662,820 A * | 9/1997 | Schwiete et al. | | 219/99 |
| 6,388,232 B1 * | 5/2002 | Samodell et al. | | 219/130.33 |
| 6,420,680 B1 * | 7/2002 | Samodell | | 219/132 |
| 7,034,245 B2 * | 4/2006 | Eldridge | | 219/121.57 |
| 7,087,856 B2 * | 8/2006 | Eldridge | | 219/121.54 |

FOREIGN PATENT DOCUMENTS

| | | |
|---|---|---|
| CN | 1044426 A | 8/1990 |
| CN | 2145087 Y | 11/1993 |
| CN | 2258445 Y | 7/1997 |
| JP | 10-006006 | 1/1998 |

* cited by examiner

*Primary Examiner* — Henry Yuen
*Assistant Examiner* — Ayub Maye
(74) *Attorney, Agent, or Firm* — Renner, Otto, Boisselle & Sklar, LLP

(57) ABSTRACT

An arc welding apparatus includes a main power supply circuit for outputting an arc current, a control circuit for controlling the main power supply circuit, and a high-frequency voltage generating circuit for generating a high-frequency voltage. When an operation switch is turned on for a first time since the apparatus is powered on, the control circuit activates the main power supply circuit to output a high voltage, and the high-frequency voltage generating circuit to generate a high-frequency voltage. With the high voltage superimposed on the high-frequency voltage, the control circuit passes a welding arc current through a torch and a base material. The switch is then turned off, and the control circuit passes a pilot arc current through the torch and the base material. The switch is turned on again, and the control circuit activates the main power supply circuit to output a high voltage, thereby allowing smooth arc transition.

6 Claims, 3 Drawing Sheets

ARC WELDING APPARATUS AND METHOD

BACKGROUND OF THE INVENTION

The invention relates to apparatus for, and methods of, welding a base material such as steel. The invention relates particularly to arc welding apparatus and methods that allow easy viewing of a welding point on a base material.

According to a type of arc welding method, a nonconsumable electrode is moved close to a base material, and a high voltage with a high-frequency voltage superimposed thereon is applied between the electrode and the base material. Then the electrode is moved away from the base material, and an electric arc is created between the electrode and the base material, thereby melting the base material with its heat. This type of method however requires significant operator skill because of its inherent difficulty in creating a molten weld pool at a desired welding point.

In view of the foregoing, JP H10-006006A discloses an arc welding apparatus that is adapted to indicate a welding point on a workpiece to an operator.

The prior art apparatus is provided with a slit light source for illuminating a welding point, an arc monitor for monitoring a molten weld pool, and an image synthesizer. The prior art apparatus is adapted to allow an operator to view the welding point on a display screen of the arc monitor.

However, the prior art apparatus has the following problems. The provision of the slit light source and the arc monitor causes the prior art apparatus to have a complicated, and therefore expensive, configuration. Also, the prior art apparatus necessitates an operator to look at each of the monitor and the base material alternately and repeatedly during a welding operation, resulting in poor operability.

In light of the foregoing problems, a feature of the invention is to provide an inexpensive, and operable, arc welding apparatus and method that allow a welding point on a base material to be appropriately indicated to an operator.

Another feature of the invention is to provide an arc welding apparatus and method that prevent generation of high-frequency noise during an arc welding operation.

Still another feature of the invention is to provide an arc welding apparatus and method that allow smooth arc transition during an arc welding operation.

SUMMARY OF THE INVENTION

An arc welding apparatus according to an aspect of the invention includes a main power supply circuit, an operation switch, a control circuit. The main power supply circuit is adapted to apply an arc voltage between a welding torch and a base material, thereby passing a welding arc current therethrough. The operation switch is adapted for use by an operator to provide an instruction to create a welding arc (hereinafter referred to as an arc start instruction). The control circuit is adapted to control the main power supply circuit such that the main power supply circuit passes a pilot arc current therefrom through the torch and the base material until an arc start instruction is provided. The pilot arc current has a smaller value than the welding arc current.

With the pilot arc current being passed through the torch and the base material, a pilot arc is established to illuminate the base material, thereby allowing an operator to view a welding point on the base material.

According to another aspect of the invention, the apparatus further includes a high-frequency voltage generating circuit for generating a high-frequency voltage. The control circuit controls the high-frequency voltage generating circuit such that the high-frequency voltage generating circuit generates a high-frequency voltage to be superimposed on the arc voltage only if a first arc start instruction is provided through the operation switch since the apparatus is powered on.

When the first arc start instruction is provided, the arc voltage with the high-frequency voltage superimposed thereon is applied between the torch and the base material, thereby facilitating creation of a welding arc. Passage of a pilot arc current is continued until another arc start instruction is provided. When another arc start instruction is provided, thus, the pilot arc current allows smooth transition form a pilot arc to a welding arc without the high-frequency voltage being superimposed on the arc voltage. Specifically, the apparatus allows the high-frequency voltage to be superimposed on the arc voltage only once after the apparatus is powered on, no matter how often arc start and arc stop instructions are repeated. Accordingly, the apparatus prevents generation of high-frequency noise.

DETAILED DESCRIPTION OF THE INVENTION

Figure 1:
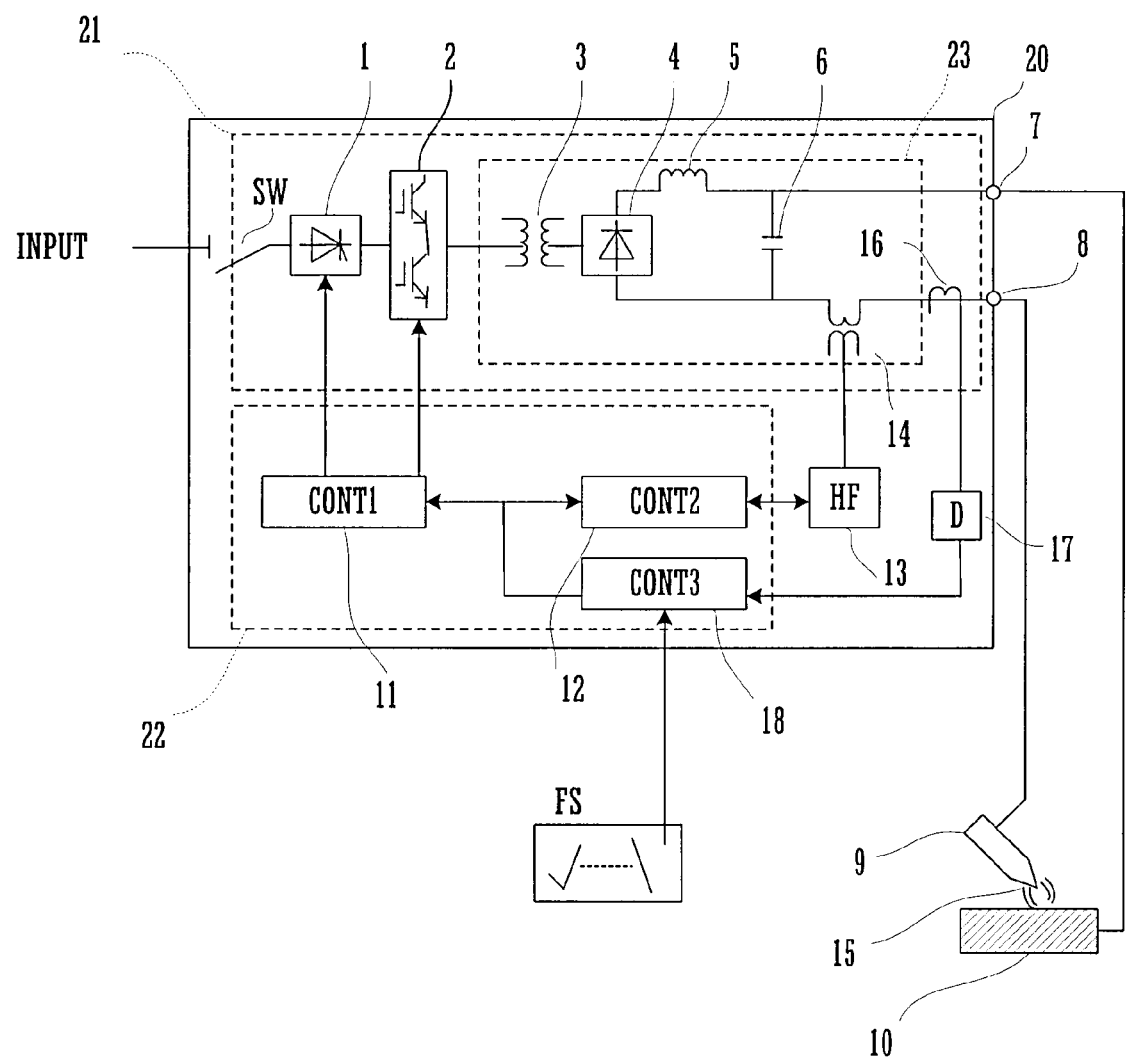
FIG. 1 is a circuit diagram illustrating an arc welding apparatus according to an embodiment of the invention.

FIG. 1 is a circuit diagram illustrating an arc welding apparatus 20 according to an embodiment of the invention.

Referring to the figure, the apparatus 20 includes a main power supply circuit 21 for outputting an arc current, and a control circuit 22 for controlling the circuit 21.

The circuit 21 has a power supply switch SW, a rectifier circuit 1, an inverter circuit 2, and an output circuit 23. The switch SW turns on or off power input from an AC power supply. The circuit 1 rectifies an AC power supply voltage that is input to an input terminal INPUT. The circuit 2 includes a switching element for switching the rectified voltage. The circuit 23 is provided for sending an output of the circuit 2 to an output terminal 7 and an output terminal 8. A base material 10 is connected to the terminal 7, and a welding torch 9 is connected to the terminal 8. It is to be noted that a semiconductor control element may alternatively substitute for the circuit 1.

The circuit 23 has an inverter transformer 3, an output rectifier 4, and a smoothing circuit. The transformer 3 converts the output voltage of the circuit 2 to a predetermined voltage. The rectifier 4 rectifies an output voltage of the transformer 3. Provided for smoothing an output voltage of the rectifier 4, the smoothing circuit has a reactor 5 and a capacitor 6.

The apparatus 20 further includes a high-frequency voltage generating circuit 13, a transformer 14, a detection coil 16, and an arc current detection circuit 17. The circuit 13 generates a high-frequency voltage. The transformer 14 superimposes the high-frequency voltage on the output of the circuit 2, namely the output high voltage of the circuit 23. The coil 16 is connected in series with the terminal 8. The circuit 17 detects current flowing through the coil 16, thereby determining value of arc current.

The circuit 22 has a first control circuit 11, a second control circuit 12, and a third control circuit 18. The circuit 11 is adapted to control operation of the circuits 1 and 2. The circuit 12 is adapted to control operation of the circuit 13. The circuit 18 outputs a control signal to the circuits 11 and 12 according to the value of arc current detected by the circuit 17 and to whether an operation switch FS (to be described later) is in on or off state. The circuit 11 corresponds to a pulse-wide modulation (PWM) control circuit for turning on or off the switching element in the circuit 2 by PWM control.

The apparatus 20 has an operation switch FS connected thereto. The switch FS is a foot switch with a pedal for an operator to press down on in order to provide an instruction to create a welding arc (hereinafter referred to as an arc start instruction). The switch FS sends an arc start signal or an arc stop signal to the circuit 18. The switch FS is normally in off state, sending out an arc stop signal. When an operator presses down on the pedal, the switch FS is turned on, and sends out an arc start signal.

The apparatus 20 operates in a manner as described below.

Figure 2:
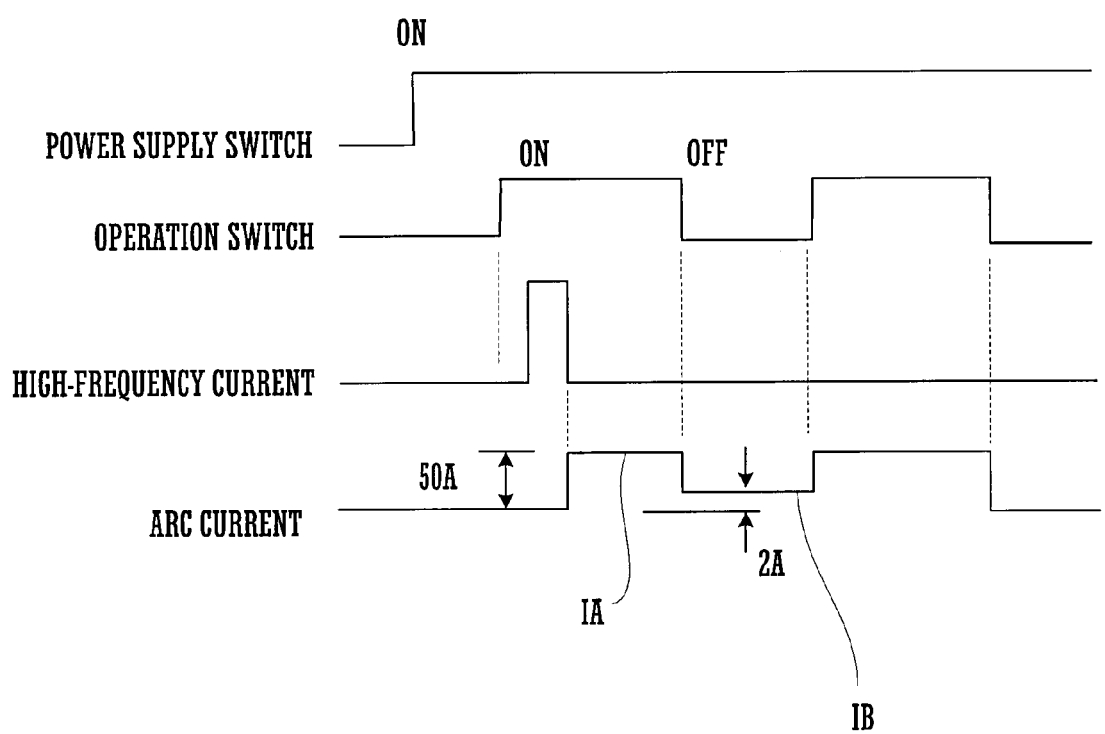
FIG. 2 is a diagram for illustrating an operation performed by the arc welding apparatus.

FIG. 2 is a diagram for illustrating an operation performed by the apparatus 20.

When the switch SW is turned on, an AC power supply voltage is input to, and rectified by, the circuit 1. The rectified voltage is then input to the circuit 2. At the time, the switch FS is in off state with the pedal not pressed down. Thus, the circuit 11 does not activate the circuit 2.

When the switch FS is turned on by pressing down on the pedal, an arc start signal is sent to the circuit 18. Then the circuit 18 determines whether the switch FS is turned on for a first time since the apparatus 20 is powered on. Specifically, the circuit 18 determines whether the circuit 17 detects zero arc current. The detection of zero arc current implies that the switch FS is turned on for the first time since the apparatus 20 is powered on.

On determination that the circuit 17 detects zero arc current, the circuit 18 sends a control signal for creating a welding arc to the circuits 11 and 12. Thus, the circuits 11 and 12 activate the circuits 2 and 13, respectively. The circuit 2 as activated causes a high voltage output of the circuit 23 to be applied between the torch 9 and the base material 10. Simultaneously, the circuit 13 as activated causes the transformer 14 to superimpose the high-frequency voltage on the high voltage. The high voltage with the high-frequency voltage superimposed thereon allows smooth creation of a welding arc 15 having a high temperature, between the torch 9 and the base material 10, thereby generating a welding arc current IA of several tens of amperes (50 amperes in the embodiment as shown in FIG. 4). The heat of the arc 15 melts the base material 10. A welding rod is then put into the arc 15 and also melted in order to weld the base material 10. The circuit 12 deactivates the circuit 13 almost simultaneously with the creation of the arc 15.

When the switch FS is turned off by releasing the pedal, an arc stop signal is sent to the circuit 18. The circuit 18 in turn sends to the circuit 11 such a control signal as to promote generation of a pilot arc current IB of approximately 0.5 ampere to approximately 2 ampere. The circuit 11 as the PWM control circuit performs PWM control of time period for which the switching element in the circuit 2 is in on or off state, thereby allowing the circuit 23 to output a minute current of approximately 0.5 ampere to approximately 2 ampere. The circuit 18 also sends to the circuit 12 a control signal for deactivating the circuit 13. Consequently, the welding arc current IA of 50 ampere drops to the pilot arc current IB of approximately 0.5 ampere to 2 ampere. The pilot arc current IB creates a pilot arc that has insufficient heat for arc welding but provides sufficient radiation for illuminating a welding point on the base material 10. Thus, the pilot arc allows an operator to view the welding point clearly in a subsequent welding operation. Also, the melted metals are solidified.

Then, when the switch FS is turned on again, an arc start signal is sent to the circuit 18. The circuit 18 determines whether the circuit 17 detects zero arc current. At this time, the circuit 17 detects the pilot arc current IB. Thus, the circuit 18 sends to the circuit 11 a control signal for creating a welding arc, but does not send to the circuit 12 a control signal for activating the circuit 13. As soon as the circuit 11 activates the circuit 2, however, the pilot arc already established between the welding torch 9 and the base material 10 makes immediate transition to the main welding arc.

The sequence as described above is repeated to obtain welds on desired portions of the base material 10.

With the switch FS turned off, the pilot arc is established to illuminate the welding point on the base material 10. Thus, the arc welding apparatus 20 allows an operator to view the welding point easily next time the operator turns on the switch FS. Also, in a welding operation that involves repeatedly turning on and off the switch FS, the high-frequency voltage generating circuit 13 is activated only once after the apparatus 20 is powered on. Accordingly, the apparatus 20 generates a very limited amount of high-frequency noise. When the switch FS is turned on, furthermore, the high voltage is applied with the pilot arc already established. Thus, the apparatus 20 ensures smooth creation of welding arc without superimposing the high-frequency voltage on the high voltage.

Figure 3:
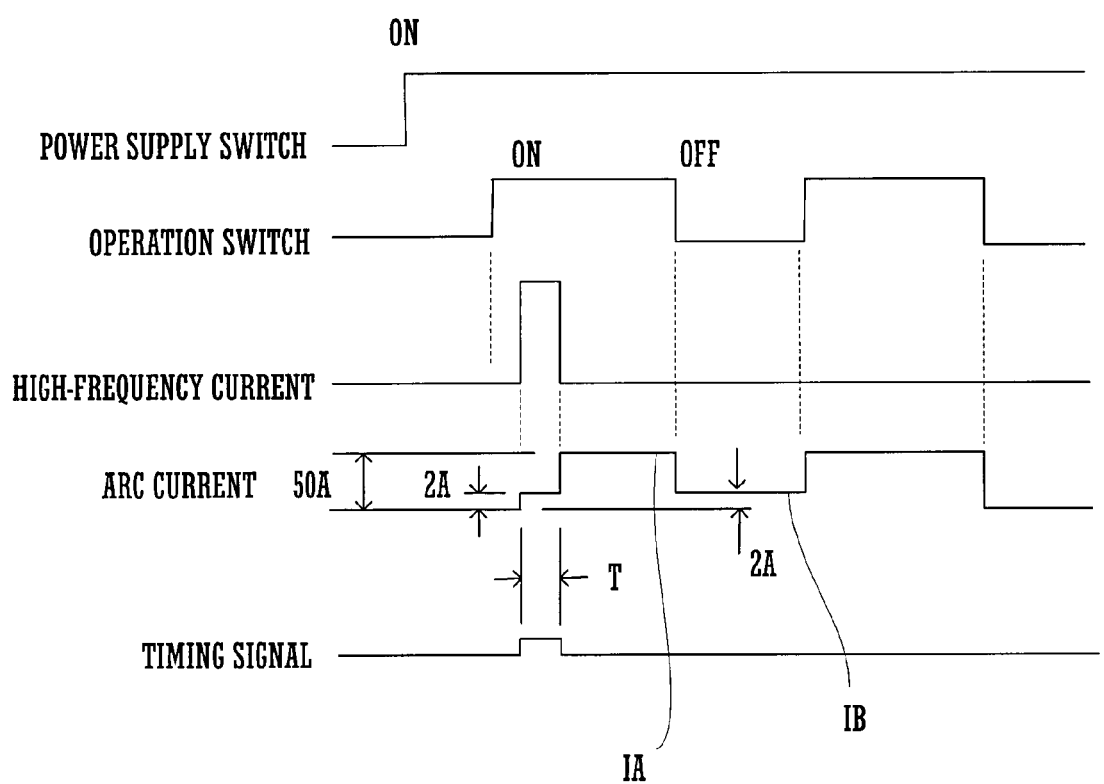
FIG. 3 is a diagram for illustrating an operation performed by an arc welding apparatus according to another embodiment of the invention.

FIG. 3 illustrates a method of control by the third control circuit 18 according to another embodiment of the invention.

When the switch SW, and then the switch FS, are turned on, the third control circuit 18 sends to the second control circuit 12 a control signal for activating the high-frequency voltage generating circuit 13. Simultaneously, the circuit 18 sends to the first control circuit 11 such a control signal as to promote output of the pilot arc current IB by the output circuit 23. Unlike in the embodiment as illustrated in FIG. 2, the circuit 11 activates the inverter circuit 2 such that the pilot arc current IB is output by the circuit 23. Therefore, a pilot arc is immediately created, thereby passing the pilot arc current IB. The pilot arc current IB rises approximately at the same time that the high-frequency voltage starts to be superimposed on the high voltage. After a lapse of predetermined time T measured by a timer (not shown) since the circuit 13 becomes activated, the circuit 18 sends to the circuit 12 a control signal for deactivating the circuit 13.

At the time, the circuit 18 also sends to the circuit 11 such a control signal as to pass the welding arc current IA from the circuit 23. Thus, the pilot arc as already established between the welding torch 9 and the base material 10 makes smooth transition to the welding arc. Subsequent steps are similar to those as taken in the embodiment as shown in FIG. 2.

The predetermined time T may alternatively be set manually.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for performing an arc welding process by passing a welding arc current through a welding torch and a base material, the apparatus comprising:

a main power supply circuit for outputting a high voltage for creating a welding arc between the welding torch and the base material to pass the welding arc current therethrough;

a high-frequency voltage generating circuit for generating a high-frequency voltage;

an operation switch operated by a user for providing an arc start instruction to create a welding arc at a start of whenever the welding arc current is to be passed through the welding torch and the base material; and a control circuit for controlling the main power supply circuit to pass a pilot arc current from the main power supply circuit through the welding torch and the base material until an arc start instruction is provided through the operation switch, the pilot arc current having a smaller value than the welding arc current, wherein the control circuit controls the pilot arc current to have insufficient heat for arc welding but sufficient radiation for illuminating a welding point on the base material to allow the user to view the welding point;

wherein upon a first arc start instruction provided through the operation switch since the apparatus is powered on, the control circuit controls the main power supply circuit to generate a high voltage, controls the high-frequency voltage generating circuit to generate a high-frequency voltage such that the high-frequency voltage is superimposed on the high voltage, and controls the high-frequency voltage generating circuit to deactivate after creation of the welding arc;

wherein upon an arc start instruction provided through the operation switch for a second time and thereafter after the arc welding with the first arc start instruction is completed, the control circuit controls the main power supply circuit to generate a high voltage without activating the high-frequency voltage generating circuit such that the high-frequency voltage is not superimposed on the high voltage; and wherein the control circuit enables the arc welding by allowing arc transition from the pilot arc current passing through the welding torch and the base material to the welding arc current with no high-frequency voltage generated by the high-frequency voltage generating circuit superimposed on the high voltage when the arc start instruction for the second time and thereafter is provided through the operation switch.

2. The apparatus according to claim 1, wherein the main power supply circuit includes:
   a rectifier circuit for rectifying power supply voltage;
   an inverter circuit having a switching element for switching the rectified voltage; and
   an output circuit for sending an output of the inverter circuit to respective output terminals for the welding torch and the base material to be connected thereto, and wherein the control circuit includes a PWM control circuit for turning on or off the switching element according to a PWM control signal.

3. The apparatus according to claim 1, wherein the control circuit controls the main power supply circuit such that the pilot arc current ranges from 0.5 ampere to 2 ampere.

4. An apparatus for performing an arc welding process by passing a welding arc current through a welding torch and a base material, the apparatus comprising:

a main power supply circuit including:
   a rectifier circuit for rectifying power supply voltage;
   an inverter circuit for switching the rectified voltage; and
   an output circuit for sending an output of the inverter circuit to respective output terminals for the welding torch and the base material to be connected thereto;

a high-frequency voltage generating circuit for generating a high-frequency voltage;

a superimposing section for superimposing the high-frequency voltage on an output of the inverter circuit;

a detecting section for detecting an arc current flowing through the welding torch and the base material, the detecting section being connected to the output circuit;

an operation switch for providing an arc start instruction to create a welding arc or an arc stop instruction to extinguish a welding arc in response to an operation of a user; and a control circuit for controlling the main power supply circuit and the high-frequency voltage generating circuit according to respective outputs of the detecting section and the operation switch as follows:

(i) the control circuit activates the high-frequency voltage generating circuit for a predetermined time period and the superimposing section superimposes the high-frequency voltage on an output of the inverter circuit, while also activating the inverter circuit such that the inverter circuit outputs the welding arc current when the detecting section detects zero arc current as a first arc start instruction is provided through the operation switch since the apparatus is powered on, and deactivates the high-frequency voltage generating circuit after creation of the welding arc;

(ii) the control circuit activates the inverter circuit and the inverter circuit outputs a pilot arc current that has a smaller value than the welding arc current when the arc stop instruction is provided through the operation switch, wherein the control circuit controls the pilot arc current to have insufficient heat for arc welding but sufficient radiation for illuminating a welding point on the base material to allow the user to view the welding point; and (iii) the control circuit activates the inverter circuit and the inverter circuit outputs the welding arc current, without activating the high-frequency voltage generating circuit when the detecting section detects the pilot arc current as the arc start instruction is provided through the operation switch for a second time and thereafter after the arc welding with the first arc start instruction is completed, wherein the control circuit enables the arc welding by allowing arc transition from the pilot arc current passing through the welding torch and the base material to the welding arc current with no high-frequency voltage generated by the high-frequency voltage generating circuit superimposed on the high voltage when the arc start instruction for the second time and thereafter is provided through the operation switch.

5. A method of performing an arc welding process by passing a welding arc current through a welding torch and a base material, the method comprising the steps of:

passing a pilot arc current from a main power supply circuit through the welding torch and the base material until an operator provides an arc start instruction to create a welding arc, wherein the pilot arc current has insufficient heat for arc welding but sufficient radiation for illuminating a welding point on the base material to allow the user to view the welding point; and passing the welding arc current from the main power supply circuit through the welding torch and the base material when the operator provides the arc start instruction; wherein upon a first arc start instruction provided through the operation switch since the apparatus is powered on, generating a high voltage for creating the welding arc current, superimposing a high-frequency voltage on the high voltage and deactivating the high-frequency voltage after creation of the welding arc, and upon an arc start instruction provided through the operation switch for a second time and thereafter after the arc welding with the first arc start instruction is completed, generating a high voltage and not superimposing the high-frequency voltage on the high voltage; and wherein the arc welding is enabled by allowing arc transition from the pilot arc current passing through the welding torch and the base material to the welding arc current with no high-frequency voltage superimposed on the high voltage when the arc start instruction for the second time and thereafter is provided.

6. The method according to claim 5, further comprising the steps of:

superimposing a high-frequency voltage on an output of the main power supply circuit so as to generate a high voltage for creating a welding arc when the operator provides an arc start instruction with no pilot arc being passed; and applying the high voltage between the welding torch and the base material to pass the welding arc current through the welding torch and the base material.

\* \* \* \* \*